US012251708B2

(12) United States Patent
Schroers

(10) Patent No.: US 12,251,708 B2
(45) Date of Patent: Mar. 18, 2025

(54) ROLLER MILL HAVING RIM ELEMENTS AND METHOD FOR SETTING AN END-FACE GAP OF THE ROLLER MILL

(71) Applicants: thyssenkrupp Industrial Solutions AG, Essen (DE); thyssenkrupp AG, Essen (DE)

(72) Inventor: Frank Schroers, Ahlen (DE)

(73) Assignee: FLSmidth A/S (DK)

( * ) Notice: Subject to any disclaimer, the term of this patent is extended or adjusted under 35 U.S.C. 154(b) by 328 days.

(21) Appl. No.: 17/622,066

(22) PCT Filed: Jun. 23, 2020

(86) PCT No.: PCT/EP2020/067541
§ 371 (c)(1),
(2) Date: Dec. 22, 2021

(87) PCT Pub. No.: WO2020/260308
PCT Pub. Date: Dec. 30, 2020

(65) Prior Publication Data

US 2022/0258170 A1 Aug. 18, 2022

(30) Foreign Application Priority Data

Jun. 28, 2019 (DE) ..................... 10 2019 209 511.9

(51) Int. Cl.
*B02C 4/02* (2006.01)
*B02C 4/28* (2006.01)
(Continued)

(52) U.S. Cl.
CPC ................ *B02C 4/02* (2013.01); *B02C 4/283* (2013.01); *B02C 4/305* (2013.01); *B02C 4/32* (2013.01); *B02C 2210/02* (2013.01)

(58) Field of Classification Search
CPC .. B02C 4/02; B02C 4/283; B02C 4/30; B02C 4/305
See application file for complete search history.

(56) References Cited

U.S. PATENT DOCUMENTS

2010/0200686 A1* 8/2010 Demuth .................... B02C 4/30 241/230
2013/0277478 A1* 10/2013 Gronvall ................. B02C 4/283 241/226
2013/0277481 A1* 10/2013 Harbold .................. B02C 4/305 241/295

FOREIGN PATENT DOCUMENTS

DE 457037 C 3/1928
DE 4037816 A1 * 6/1992 ............ B02C 4/283
(Continued)

OTHER PUBLICATIONS

Buchholz, translation of DE-4037816 (Year: 1992).*
English Translation of International Search Report issued in PCT/EP2020/067541, dated Sep. 9, 2020.

*Primary Examiner* — Bobby Yeonjin Kim
(74) *Attorney, Agent, or Firm* — Jeffrey A. Sharp

(57) ABSTRACT

A milling roll of a roll mill may have a roll main body and an edge element that is attached to an end region of a roll end of the milling roll and extends in a radial direction beyond a surface of the roll main body. The edge element comprises a base flange and a spacer element that is attached thereto. Wear protection elements can be attached to the spacer element. Furthermore, a roll mill may have a first milling roll and a second milling roll that are arranged opposite one another and can be driven in opposite directions. A milling gap is disposed between the milling rolls, and an edge element on one of the milling rolls may extend over the milling gap and at least partially cover an end side of the opposite milling roll.

18 Claims, 3 Drawing Sheets

(51) Int. Cl.
*B02C 4/30* (2006.01)
*B02C 4/32* (2006.01)

(56) References Cited

FOREIGN PATENT DOCUMENTS

| | | | | | |
|---|---|---|---|---|---|
| DE | 20 2014 006 837 | U1 | | 9/2014 | |
| DE | 10 2017 208 014 | A1 | | 11/2018 | |
| EP | 2 653 230 | A2 | | 10/2013 | |
| EP | 2756886 | B1 | | 6/2017 | |
| WO | 2013158346 | A1 | | 10/2013 | |
| WO | 2014/117783 | A1 | | 8/2014 | |
| WO | WO-2018206200 | A1 | * | 11/2018 | ............. B02C 4/283 |

* cited by examiner

ROLLER MILL HAVING RIM ELEMENTS AND METHOD FOR SETTING AN END-FACE GAP OF THE ROLLER MILL

CROSS REFERENCE TO RELATED APPLICATIONS

This application is a U.S. National Stage Entry of International Patent Application Serial Number PCT/EP2020/067541, filed Jun. 23, 2020, which claims priority to German Patent Application No. DE 10 2019 209 511.9, filed Jun. 28, 2019, the entire contents of both of which are incorporated herein by reference.

FIELD

The present disclosure generally relates to roll mills with edge elements, and to methods for setting end-side gaps of roll mills.

BACKGROUND

Roll mills are usually used for the comminution of material to be milled, such as, for example, limestone, clinker or similar rocks. In the case of the comminution of material to be milled in a roll mill, it can occur that material to be milled escapes laterally out of the milling gap, without having passed the milling gap completely or at all. This leads to the decrease of the throughput capacity of the machine and to the increase of the milling circulations, which is linked with an enormous energy requirement.

For the controlled influencing of the lateral outflow of material to be milled from a milling gap which is configured between the milling rolls of a roll mill, it is known for edge elements to be arranged on one of the milling rolls. A roll mill of this type with edge elements is known, for example, from DE 20 2014 006 837 U1.

In the case of the operation of the roll mill with different rock types with a different grain size, an increased material outflow from the milling gap frequently occurs. In addition, usually occurring skewed running of the milling rolls causes differing wear of the edge elements. Thus a need exists for a roll mill that compensates for wear of the edge elements, can be operated with different rock types, and therefore reduces the maintenance costs of the roll mill and optimizes the milling process.

SUMMARY

In accordance with a first aspect, a milling roll of a roll mill comprises a roll main body and an edge element which is attached to an edge region of the roll main body of the milling roll and extends in the radial direction beyond the surface of the roll main body of the milling roll. The edge element comprises a base flange and a spacer element which is attached thereto, a plurality of wear protection elements being attached to the spacer element.

The edge element preferably extends by from 10 to 40 cm, preferably by from 15 to 30 cm, in particular by from 20 to 25 cm beyond the surface of the roll main body, in particular the milling face. The milling face is preferably the circumferential face of the cylindrical roll main body. The milling face is preferably provided with a plurality of, in particular, pin-shaped wear protection elements.

The base flange is preferably configured as a circularly annular plate which comprises, for example, a steel and is fastened to the roll main body, in particular is welded to it.

For example, the base flange is configured in one piece with the roll main body, for example is cast. The spacer element is attached between the wear protection element and the base flange. The spacer element is preferably configured from steel, plastic, brass or copper. The spacer element is attached to that side face of the base flange which points inward in the axial direction of the milling roll.

The spacer element between the base flange and the wear protection element ensures a spacing of the wear protection element from the base flange, it being possible for the spacing to be set via the selected thickness of the spacer element. The spacer element has, for example, a thickness of from 0.1 mm to 40 mm, preferably of from 5 mm to 30 mm, in particular 20 mm.

The edge element is connected, for example, releasably to the roll main body of the milling roll. The milling roll preferably comprises a drive shaft for driving the milling roll, on which drive shaft the roll main body is arranged. A releasable arrangement of the edge elements on the roll main body affords the advantage of a rapid and simple exchange of the edge elements in the case of wear. The edge elements are, for example, adhesively bonded, soldered, welded or screwed onto the roll main body.

In accordance with a first embodiment, the spacer element is fastened releasably to the base flange. For example, the spacer element is fastened to the base element via screws or bolts. A plurality of spacer elements are preferably arranged next to one another on the base flange and are fastened to the base flange in each case via a releasable connecting means, such as a screw or a bolt. A releasable fastening of the spacer element to the base flange makes a simple replacement of the spacer element possible. For example, the spacer element is replaced, in order to increase or to decrease the spacing between the wear protection element and the base flange.

In accordance with a further embodiment, the spacer element is of plate-shaped configuration.

In accordance with a further embodiment, the spacer element is of circularly annular or partially circularly annular configuration. Precisely one or a plurality of spacer elements is/are attached to the base element, for example.

In accordance with a further embodiment, the base flange is configured as a circularly annular plate. The base flange is preferably connected fixedly to the roll main body, in particular is welded to or configured in one piece with the latter.

In accordance with a further embodiment, the wear protection elements are attached releasably to the spacer element. The wear protection elements are preferably fastened to the respective spacer element by means of a releasable connecting element, such as a screw or a bolt. A releasable connection of the wear protection elements makes a simple replacement of the wear protection elements possible, for example in a case of wear.

In accordance with a further embodiment, the base flange is connected releasably to the roll main body of the milling roll. The base flange is preferably fastened to the roll round body by means of screws or bolts. For example, the base flange is attached at least partially to the end side of the roll main body. A releasable connection of the base flange to the roll main body makes a replacement of the complete edge element possible in a simple way.

The invention also comprises a roll mill having a first milling roll and a second milling roll which are arranged opposite one another and which can be driven in opposite directions, at least one milling roll being configured as described in the preceding text. A milling gap is configured between the milling rolls, the edge element being configured in such a way that it extends over the milling gap and covers the opposite milling roll on the end side at least partially. It is likewise conceivable that each of the milling rolls has in each case precisely one edge element. Each of the milling rolls has, in particular, a first end region and a second end region, the first milling roll having, on its first end region, an edge element which covers the first end region of the second milling roll in the region of the milling gap on the end side. The second milling roll preferably has, on its second end region, an edge element which covers the second end region of the first milling roll in the region of the milling gap on the end side. In particular, the edge elements are arranged so as to lie diagonally opposite one another in relation to the end regions of the milling rolls. In a further embodiment, exclusively one milling roll has two edge elements which are attached to opposite roll ends of the milling rolls, the opposite milling roll not having any edge element. In each case one end-side gap is preferably configured between the edge elements and the end side of the respective opposite milling roll. An end-side gap prevents a collision of the edge element with the end region of the respective opposite milling roll in the case of skewed running of the milling rolls, the milling rolls which lie opposite one another not being arranged parallel to one another. In the case of a parallel arrangement of the opposite milling rolls with respect to one another, the end-side gap serves to decrease the wear of the edge elements.

The edge elements preferably cover the opposite milling rolls by approximately from 2 to 10%, in particular from 4 to 7%, preferably 5% of the roll diameter. The coverage is understood to mean that region of the opposite milling roll, along which the edge element extends in the radial direction. An excessively small coverage leads to an outflow of the material past the edge elements, an excessively large coverage leading to a collision in the case of skewed positioning of the milling rolls with respect to one another. A coverage of the edge elements of approximately from 2 to 10%, in particular from 4 to 7%, preferably 5% of the roll diameter affords an optimum coverage, a collision and an outflow of the material beyond the edge elements being avoided. The milling rolls of the roll mill are preferably of structurally identical configuration. This affords the advantage of an easy replacement capability of the milling rolls in the case of maintenance, and makes a time and cost saving possible.

The invention also comprises a method for setting an end-side gap of a roll mill with a first milling roll and a second milling roll which are arranged so as to lie opposite one another and which can be driven in opposite directions. A milling gap is configured between the milling rolls, each of the milling rolls having, on an end region of a respective roll end, an edge element which is configured in such a way that it extends over the milling gap and covers the opposite milling roll on the end side at least partially, with the result that an end-side gap is configured between the edge element and the end side of the respective opposite milling roll. The edge element has a base flange. The method for setting the end-side gap comprises the steps:

attaching a spacer element to the base flange, and attaching a plurality of wear protection elements to the spacer element.

The advantages which are described in relation to the milling roll apply accordingly in method terms to the method for setting an end-side gap. The described method preferably serves for setting the width of the end-side gap, the width of the end-side gap preferably being dependent on the thickness of the spacer element. The spacer element is attached, in particular, to that side face of the base flange which points axially inward in the direction of the end-side gap, with the result that the width of the end-side gap is decreased. Each edge element of the roll mill preferably has an identical spacer element, with the result that the end-side gaps of a milling roll preferably have the same width. It is likewise conceivable that a plurality of, for example two or three, spacer elements are attached next to one another in the axial direction to in each case one base flange.

In accordance with one embodiment, the spacer element and the wear protection elements are fastened releasably to the base flange. The spacer element is preferably attached to the base flange by means of screws or bolts. The wear protection elements are preferably attached to the spacer element in each case by means of releasable fastening means such as screws. For example, the plurality of spacer elements are screwed to one another and to the base flange.

An above-described edge element with a spacer element and a plurality of wear protection elements affords the advantage of a simple setting capability of the edge-side gap, with the result that, depending on the application, a spacer element with a corresponding thickness can be fastened to the base flange in a simple way and the desired end-side gap is therefore set.

BRIEF DESCRIPTION OF THE DRAWINGS

In the following text, the present disclosure is described in greater detail on the basis of a plurality of exemplary embodiments with reference to the appended figures.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Figure 1:
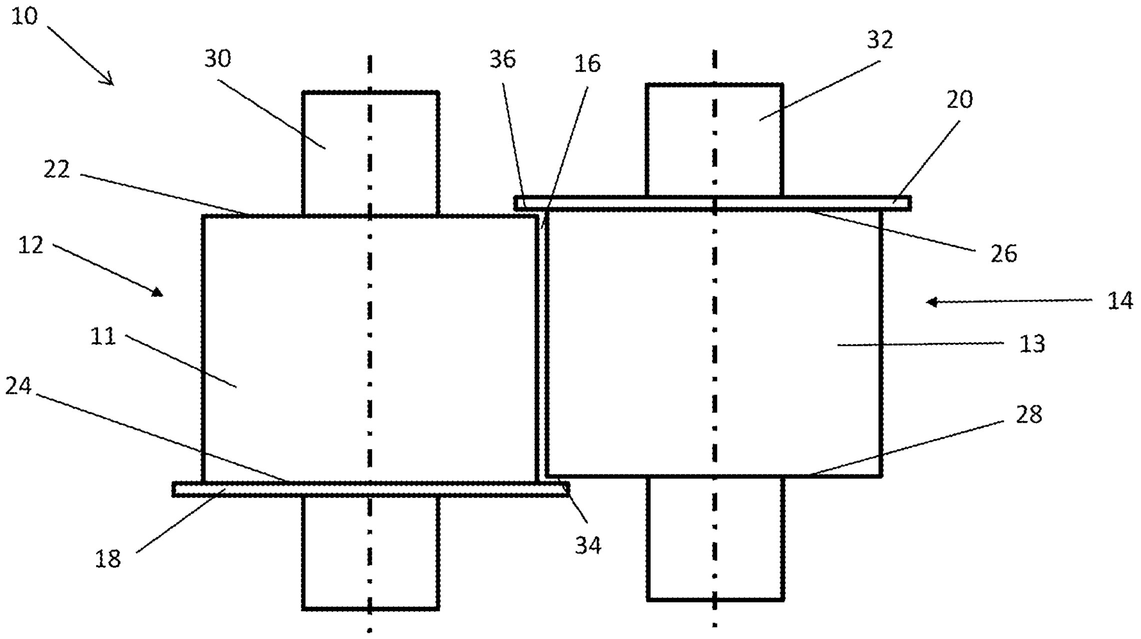
FIG. 1 is a diagrammatic view of an example roll mill with two milling rolls that in each case have an edge element.

FIG. 1 shows a roll mill 10 with a first milling roll 12 and a second milling roll 14 which in each case have a substantially cylindrical roll main body. The milling rolls 12, 14 are arranged so as to lie opposite one another, and can be driven in opposite directions. A milling gap 16 which extends in the axial direction is configured between the milling rolls 12, 14. The milling rolls 12, 14 are arranged parallel to one another, with the result that the milling gap 16 which extends between the milling rolls 12, 14 has a constant width. Furthermore, each of the milling rolls 12, 14 has a drive shaft 30, 32 which extends along the center axis through the respective milling roll 12, 14 and drives the milling rolls such that they rotate about the center axis thereof. The first and the second milling roll 12, 14 have the same diameter and the same length, and are of substantially structurally identical configuration.

The milling rolls 12, 14 in each case have a first end region 24, 28 and a second end region 22, 26 which are arranged at opposite ends of the milling roll. The first end region 24 of the first milling roll 12 is arranged so as to lie opposite the first end region 28 of the second milling roll 14, the second end region 22 of the first milling roll 12 being arranged so as to lie opposite the second end region 26 of the second milling roll 14.

Furthermore, the roll mill 10 has a first edge element 18 and a second edge element 20, in each case one edge element 18, 20 being arranged on each milling roll 12, 14. The edge elements 18, 20 are arranged so as to lie diagonally opposite one another in relation to the end regions 22 to 28 of the milling rolls 12, 14. On its first end region 24, the first milling roll 12 has an edge element 18 which extends in the radial direction over the milling gap 16 and covers the end side of the second milling roll 14 on the first end region 28 partially. On its second end region 26, the second milling roll 14 has an edge element 20 which extends in the radial direction over the milling gap 16 and covers the end side of the first milling roll 12 on its second edge region 22 partially. The second edge element 20 is arranged on the diagonally opposite end region 26 of the second milling roll 14 in relation to the first edge element 18. The milling rolls 12, 14 are arranged offset in the axial direction, with the result that a first end-side gap 34 is configured between the first edge element 18 and the end side of the second milling roll 14 and a second end-side gap 36 is configured between the second edge element 20 and the end side of the first milling roll 12. The first and the second end-side gap 34, 36 extend in each case in the radial direction.

Each milling roll 12, 14 comprises a preferably cylindrical roll main body 11, 13 which has a milling face which is formed by way of the cylindrical surface of the roll main body. The edge elements 18, 20 comprise, for example, in each case one circumferential circular ring which is attached to the respective milling roll 12, 14 in a way which is not shown. For example, the edge elements 18, 20 are attached to the end side or on the outer circumference of the milling roll, in particular the respective roll main body. For example, a circumferential groove is arranged on the outer circumference of the respective milling roll 12, 14, in which groove in each case one edge element 18, 20 is arranged. The edge elements 18, 20 are configured from a wear-resistant material, such as, for example, steel, and have, for example, a thickness of from 10 mm to 100 mm and cover the opposite milling rolls 12, 14 by approximately from 2 to 10%, in particular from 4 to 7%, preferably 5% of the roll diameter.

Figure 2:
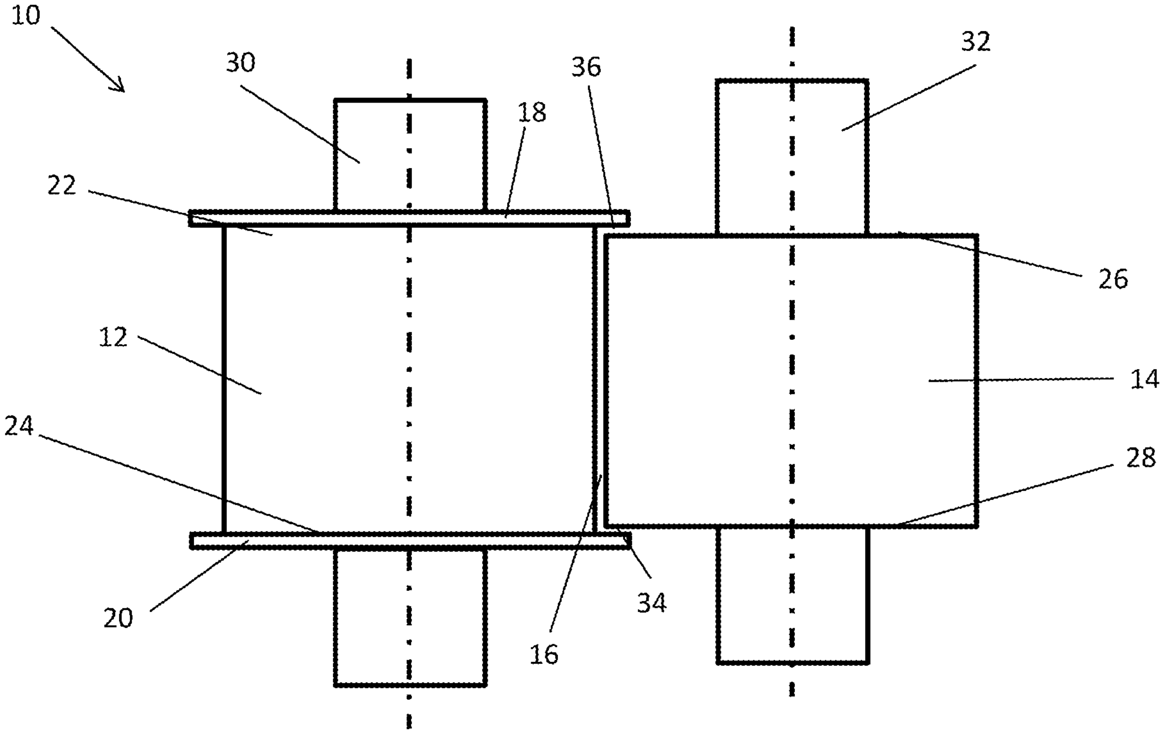
FIG. 2 is a diagrammatic view of another example roll mill, that is, a roll mill having two edge elements.

FIG. 2 shows a roll mill 10 with a first milling roll 12 and a second milling roll 14 in accordance with the exemplary embodiment from FIG. 1. In contrast to FIG. 1, the first milling roll 12 has two edge elements 18, 20 which are attached in each case to an end region of the milling roll 12. The first edge element 18 is attached to the first edge region 22 of the first milling roll 12, and extends in a radial direction beyond the milling gap 16, with the result that it covers the end side of the second milling roll 14 on the first end region 26 partially. The second edge element 20 is attached to the second end region 24 of the first milling roll 12, and extends in the radial direction beyond the milling gap 16, with the result that it covers the end side of the second milling roll 14 on the second end region 28 partially. An end-side gap 34, 36 is configured in each case between the edge elements 18 and the respective end side of the second milling roll 14.

Figure 3:
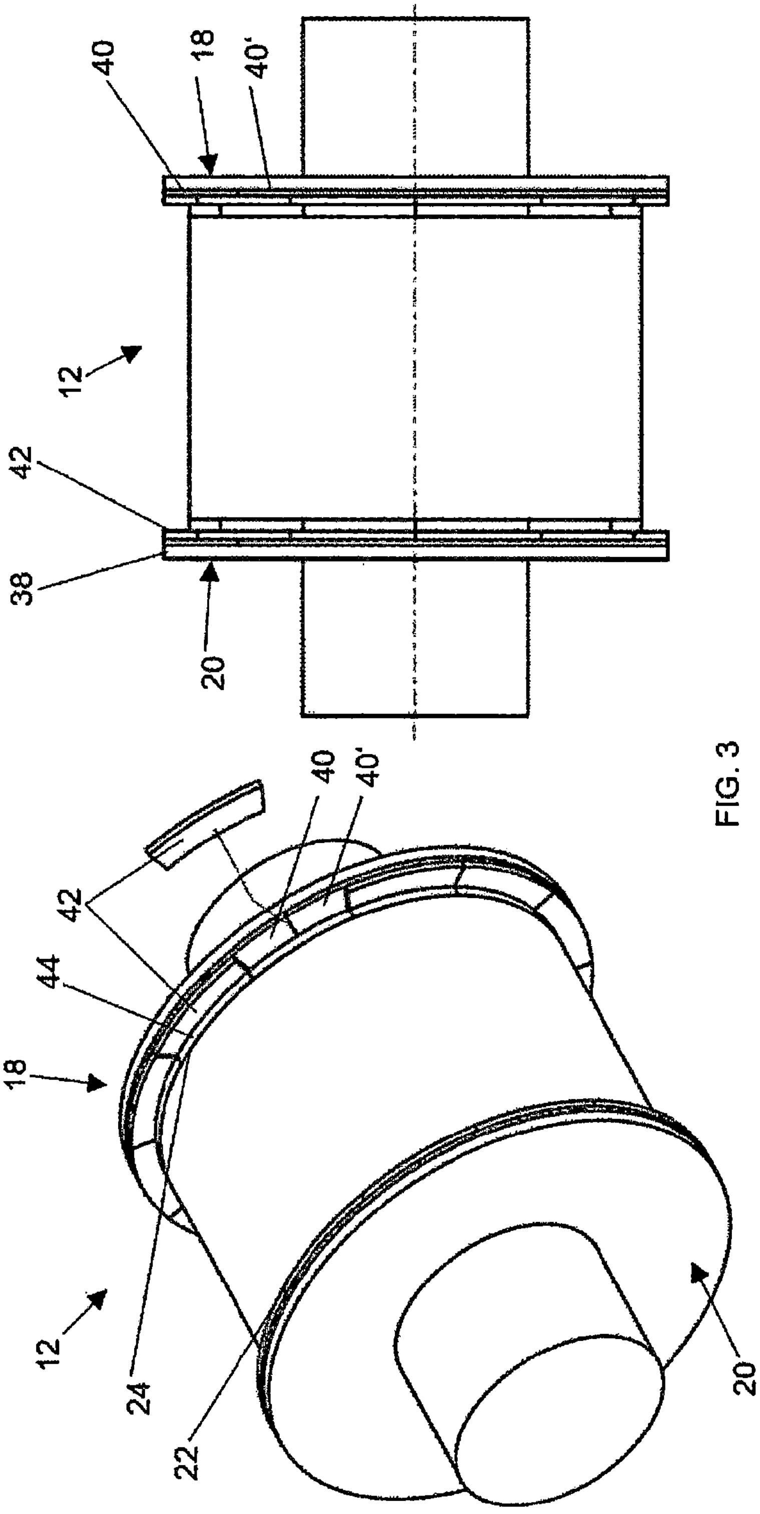
FIG. 3 is a diagrammatic view of still another example milling roll with two edge elements in a perspective view and a top view.

FIG. 3 shows a milling roll, by way of example the first milling roll 12 of FIGS. 1 and 2, with two edge elements 18, 20. Each of the edge elements 18, 20 comprises a base flange 38 which, by way of example, is a circularly annular plate. The base flange 38 is preferably configured in one piece from, for example, steel, and is fastened to the roll main body of the milling roll 12, in particular is welded or is configured in one piece with the latter, in particular is cast. A spacer element 40 is attached to the base flange 38. The spacer element 40 is configured, for example, as a circularly annular plate. It is likewise conceivable that the spacer element 40 has a plurality of partially circularly annular segments 40' which preferably together result in a circular ring and are attached next to one another to the base flange. The spacer element 40 is preferably configured from steel, plastic, brass or copper. The spacer element 40 is attached to the base flange, for example, releasably by means of a non-positive and/or positively locking connecting means. For example, the spacer element 40 is fastened to the base flange 38 by means of one or a plurality of screws. The spacer element 40 is attached to the side face which points inward in the axial direction of the milling roll 12, and covers the latter completely, for example.

A plurality of wear protection elements 42 are attached to the spacer element 40. The wear protection elements 42 are, for example, plate-shaped, and are configured from a wear-resistant material, such as, for example, tungsten carbide or ceramic. The wear protection elements 42 are preferably attached next to one another to the spacer element 40, with the result that that surface of the spacer element 40 which points inward in the axial direction of the milling roll 12 is preferably covered completely by one or a plurality of wear protection elements 42. The wear protection elements 42 are fastened to the spacer element 40, for example, by means of a releasable connecting means, such as screws or bolts.

The milling roll 12 has by way of example an edge protection means 44 which preferably comprises a plurality of corner blocks which are attached to an end region of the milling roll, for example, in a circumferential groove. The edge protection means 44 preferably lies against the wear protection elements 42.

A spacer element 40 makes simple setting of the end-side gap 34, 36 of the roll mill 10 possible, in particular without an axial displacement of the milling rolls 12, 14 with respect to one another. In order to set the end-side gap 34, 36, a spacer element 40 with a corresponding thickness is attached to the base flange 38. Subsequently, for example, the wear protection elements 42 are fastened to the spacer element 40. In order to achieve a further increase or decrease of the end-side gap 34, 36, an axial displacement of at least one of the milling rolls 12, 14 relative to the other milling roll 12, 14 is possible.

LIST OF DESIGNATIONS

10 Roll mill
11 Roll main body
12 First milling roll
13 Roll main body
14 Second milling roll
16 Milling gap
18 First edge element
20 Second edge element

22 Second end region of the first milling roll
24 First end region of the first milling roll
26 Second end region of the second milling roll
28 end region of the second milling roll
30 Drive shaft of the first milling roll
32 Drive shaft of the second milling roll
34 First end-side gap
36 Second end-side gap
38 Base flange
40 Spacer element
42 Wear protection element
44 Edge protection means

What is claimed is:

1. A milling roll of a roll mill, comprising:
a roll main body having a milling face; and
an edge element that is attached to an end region of the roll main body, wherein the edge element comprises:
a base flange,
a spacer element that is rigidly attached to the base flange, and
wear protection elements that are attached to the spacer element,
wherein the spacer element is disposed between the wear protection elements and the base flange,
wherein the base flange, spacer element, and wear protection elements each extends in a radial direction beyond the milling face of the roll main body.

2. The milling roll of claim 1 wherein the wear protection elements are fastened releasably to the spacer element using releasable connecting elements.

3. The milling roll of claim 1 wherein the wear protection elements are plate-shaped.

4. The milling roll of claim 1 wherein the base flange is configured as a circularly annular plate.

5. The milling roll of claim 1 wherein the spacer element is configured as a circularly annular plate.

6. The milling roll of claim 1 wherein the spacer element is a first spacer element and is configured as a partially circularly annular plate, wherein at least the first spacer element and a second spacer element are attached to the base flange.

7. The milling roll of claim 1 wherein the wear protection elements are attached releasably to the spacer element.

8. The milling roll of claim 1 wherein the base flange is connected releasably to the roll main body.

9. A roll mill comprising:
a first milling roll and a second milling roll that are arranged opposite one another and are configured to be driven in opposite directions, wherein the first milling roll is the milling roll of claim 1; and
a milling gap between the first and second milling rolls, wherein the edge element of the first milling roll extends over the milling gap and at least partially covers the second milling roll on an end side.

10. The roll mill of claim 9 wherein with respect to the first milling roll the spacer element is fastened releasably to the base flange.

11. The roll mill of claim 9 wherein with respect to the first milling roll the spacer element is plate-shaped.

12. The roll mill of claim 9 wherein with respect to the first milling roll the base flange is configured as a circularly annular plate.

13. The roll mill of claim 9 wherein with respect to the first milling roll the spacer element is configured as a circularly annular plate.

14. The roll mill of claim 9 wherein with respect to the first milling roll the spacer element is a first spacer element and is configured as a partially circularly annular plate, wherein at least the first spacer element and a second spacer element are attached to the base flange.

15. The roll mill of claim 9 wherein with respect to the first milling roll the wear protection elements are attached releasably to the spacer element.

16. The roll mill of claim 9 wherein with respect to the first milling roll the base flange is connected releasably to the roll main body.

17. A method for setting an end-side gap of a roll mill with a first milling roll and a second milling roll that are arranged opposite one another and are configured to be driven in opposite directions, each of the first milling roll and the second milling roll having a cylindrical roll main body with a milling face, wherein a milling gap is disposed between the first and second milling rolls, wherein at each end of the milling gap an end region of one of the milling rolls has an edge element that is configured to extend over the milling gap and at least partially cover an end side of the opposing milling roll, thereby forming the end-side gap between the edge element and the end side of the respective opposite milling roll, with the edge element having a base flange, the method comprising:
rigidly attaching a spacer element to the base flange; and
attaching wear protection elements to the spacer element;
wherein the spacer element is disposed between the wear protection elements and the base flange;
wherein the spacer element and wear protection elements extend radially beyond the milling face of its respective milling roll.

18. The method of claim 17 comprising fastening the spacer element and the wear protection elements releasably.

* * * * *